(12) United States Patent
Yamamoto et al.

(10) Patent No.: US 11,448,277 B2
(45) Date of Patent: Sep. 20, 2022

(54) FRICTION MATERIAL

(71) Applicant: NISSHINBO BRAKE, INC., Tokyo (JP)

(72) Inventors: Kazuhide Yamamoto, Gunma-ken (JP); Takuya Matsuzawa, Gunma-ken (JP)

(*) Notice: Subject to any disclaimer, the term of this patent is extended or adjusted under 35 U.S.C. 154(b) by 0 days.

(21) Appl. No.: 15/876,201

(22) PCT Filed: Jul. 15, 2016

(86) PCT No.: PCT/JP2016/070953
§ 371 (c)(1),
(2) Date: Jan. 22, 2018

(87) PCT Pub. No.: WO2017/014173
PCT Pub. Date: Jan. 26, 2017

(65) Prior Publication Data
US 2018/0172098 A1 Jun. 21, 2018

(30) Foreign Application Priority Data

Jul. 22, 2015 (JP) .............................. JP2015-145046
Jul. 1, 2016 (JP) ................................. 2016-001976

(51) Int. Cl.
| | | |
|---|---|---|
| F16D 69/02 | (2006.01) |
| C09K 3/14 | (2006.01) |
| C08L 77/10 | (2006.01) |
| C08L 1/02 | (2006.01) |
| C08K 3/26 | (2006.01) |
| C08L 99/00 | (2006.01) |
| C08L 61/14 | (2006.01) |
| C08K 3/30 | (2006.01) |
| C08K 3/22 | (2006.01) |

(52) U.S. Cl.
CPC .............. *F16D 69/026* (2013.01); *C08K 3/26* (2013.01); *C08L 1/02* (2013.01); *C08L 61/14* (2013.01); *C08L 77/10* (2013.01); *C08L 99/00* (2013.01); *C09K 3/14* (2013.01); *C08K 2003/2237* (2013.01); *C08K 2003/262* (2013.01); *C08K 2003/3036* (2013.01); *C08L 2205/16* (2013.01)

(58) Field of Classification Search
CPC ......... F16D 69/026; C09K 3/14; C08L 77/10; C08L 1/02; C08L 2205/16; C08L 99/00; C08L 61/14; C08K 3/26; C08K 2003/3036; C08K 2003/262; C08K 2003/2237
USPC ...................................................... 523/156
See application file for complete search history.

(56) References Cited

U.S. PATENT DOCUMENTS

| | | | | |
|---|---|---|---|---|
| 4,386,168 | A * | 5/1983 | Fujimaki ................... | C08K 3/04 523/155 |
| 7,326,741 | B2 * | 2/2008 | Kusaka .................. | F16D 69/026 523/152 |
| 2009/0048369 | A1 * | 2/2009 | Newcomb ............. | D06M 15/41 523/149 |
| 2014/0174319 | A1 * | 6/2014 | Yamamoto ............ | F16D 69/025 106/36 |
| 2015/0192182 | A1 * | 7/2015 | Yamamoto ............ | F16D 69/026 523/157 |
| 2016/0230827 | A1 * | 8/2016 | Kaji ....................... | F16D 69/026 |

FOREIGN PATENT DOCUMENTS

| | | | | |
|---|---|---|---|---|
| EP | 2871221 A1 | 5/2015 | | |
| JP | 2000-205318 | 7/2000 | | |
| JP | 2001-107027 | 4/2001 | | |
| JP | 2002-266915 | 9/2002 | | |
| JP | 2004-352738 A | 12/2004 | | |
| JP | 2008-45703 | 2/2008 | | |
| JP | 2014-012766 A | 1/2014 | | |
| JP | 2014-169222 A | 6/2014 | | |
| JP | 2014-159871 A | 9/2014 | | |
| WO | WO-2014007130 A1 * | 1/2014 | ........... | F16D 69/026 |
| WO | WO-2015041098 A1 * | 3/2015 | ............ | C08L 101/06 |
| WO | WO2015072445 | 5/2015 | | |

OTHER PUBLICATIONS

Office action dated Jan. 7, 2020 by Japan Patent Office for JP Patent Application No. 2016-001976.

* cited by examiner

*Primary Examiner* — Angela C Scott
(74) *Attorney, Agent, or Firm* — Apex Juris PLLC; Tracy M Heims

(57) ABSTRACT

[Object] To provide a friction material, which is manufactured by forming a non-asbestos-organic (NAO) friction material composition, used for a disc brake assembled in such as a passenger car, which does not degrade the inhibitory effect of rusting and prevents seizure due to corrosion even if the automotive while the parking brake in operation is left under a high humidity state for a long period of time. [Means to Resolve] A friction material, which is manufactured by forming the NAO friction material composition including a binder, a fiber base material, a friction modifier, a lubricant, a pH adjuster, and a filler, where the friction material composition contains 2-6 weight % of alkali metal salt and/or alkaline earth metal salt as the pH adjuster relative to the total amount of the friction material composition, 1-7 weight % of fibrillated organic fiber as the fiber base material relative to the total amount of the friction material composition, and 0-0.5 weight % of water-repelling component relative to the total amount of the friction material composition.

3 Claims, No Drawings

FRICTION MATERIAL

DETAIL DESCRIPTION OF THE INVENTION

Field of the Invention

This invention relates to a friction material, which is manufactured by forming a non-asbestos-organic (NAO) friction material composition used for a disc brake pad.

Background of the Invention

Conventionally, a disc brake is used as a braking device for a passenger car, and a disc brake pad, which has a metallic base member on which a friction material is affixed, is used as a friction material member.

The friction material used for the disc brake pad is mainly categorized into three types.

<Semi-Metallic Friction Material>

A semi-metallic friction material contains 30 weight % or more but less than 60 weight % of a steel fiber as a fiber base material relative to the total amount of the friction material composition.

<Low Steel Friction Material>

A low steel friction material contains a steel fiber in a part of the fiber base material and contains less than 30 weight % of the steel fiber relative to the total amount of the friction material composition.

<Non-Asbestos-Organic (NAO) Friction Material>

A NAO friction material does not contain a steel type fiber such as a steel fiber and a stainless steel fiber as the fiber base material.

Recently, quietness and stillness in braking operation is in demand, and a friction material using NAO friction material which generates less brake noise has been widely used.

However, such NAO friction material has a problem of causing seizure due to corrosion when it is used for a disc brake having an electronic parking brake function is employed in a fluid type service brake unit, as disclosed in Patent Document 1.

Seizure due to corrosion is phenomena in which a disc rotor and the friction material stick together due to the rust after leaving the automotive while the parking brake in operation for a long period of time.

Technique to add the pH adjuster such as an alkali metal salt and/or an alkaline earth metal salt into the friction material is known to inhibit the rusting that is a cause of the seizure due to corrosion.

Patent Document 2 discloses the friction material for a brake containing the fiber base material, the friction modifier, and the binder, which is characterized in containing, as the material that is effective in preventing iron rusting, a hydroxide that is the alkali metal or alkaline earth metal (such as a calcium hydroxide) and a carbonate that is the alkali metal or alkaline earth metal (such as a sodium carbonate).

Patent Document 3 discloses the friction material, which is manufactured by heat press forming the friction material composition, containing 0.2-5 weight % of the alkali metal salt (sodium carbonate or potassium carbonate) therein relative to the total amount of the friction material composition.

According to Patent Document 2 and Patent Document 3, the friction material disclosed therein can maintain pH of contacting surfaces between the friction material and the disc rotor alkaline and can inhibit the rusting of the disc rotor.

Also, method of inhibiting the rusting of the disc rotor by adding a water-repelling material in the friction material is considered therein.

Patent Document 4 discloses the non-asbestos disc brake pad for an automotive containing the fiber base material, the binder, and the friction modifier, where the binder at least contains a silicone modified resin, the friction modifier contains an abrasive with the average particle diameter of 0.5-5 μm and the Mohs hardness of 7 or more, and the organic filler containing the cashew dust with the average particle diameter of 250 μm or less.

According to the non-asbestos disc brake pad for an automotive disclosed in Patent Document 4, a water-repelling film that repels water which can be a cause of rusting can be formed on a friction surface of the disc rotor as a result of the friction by braking, thereby inhibiting the rusting of the disc rotor.

It can be understood that it is possible to obtain an extremely satisfactory effect of inhibition with respect to the rusting of the disc rotor by synergy to use both such as the pH adjuster and water-repelling material.

However, it was found that the inhibition effect was limited to an initial stage of the friction material usage, and if the automotive while the parking brake is in operation is left under a high humidity state for a long period of time, the rust inhibition effect dramatically drops and the sticking occurs at the end.

PRIOR ART

Patent Document

[Patent Document 1] JP Provisional Patent Publication No. 2008-45703
[Patent Document 2] JP Provisional Patent Publication No. 2000-205318
[Patent Document 3] JP Provisional Patent Publication No. 2001-107027
[Patent Document 4] JP Provisional Patent Publication No. 2002-266915

SUMMARY OF THE INVENTION

Means to Resolve by the Invention

This invention provides a friction material, which is manufactured by forming an NAO friction material composition, used for a disc brake of such as a passenger car, where the friction material does not degrade an inhibition effect of rusting and prevents seizure due to corrosion even if the automotive while the parking brake in operation, is left under a high humidity state for a long period of time.

Means to Resolve the Problems

Inventors of this invention, after serious investigation, found that a water-repelling material is to be added in the friction material composition in order to eliminate water which normally can be a direct cause of rusting; however, for the friction material, which includes the alkali metal salt and/or the alkaline earth metal hydroxide as the pH adjuster, supplying appropriate absorbency in the friction material itself prevents from degrading the inhibition effect of the rusting even if the automotive while the parking brake is in operation is left under a high humidity state for a long period of time.

Furthermore, the inventors completed this invention as finding that the prevention of degrading the inhibition effect of the rusting is further improved by adding a specific metal sulfide as the lubricant, a specific porous particle as the friction modifier, and a specific titanate.

This invention relates to the friction material, which is manufactured by forming the NAO friction material composition, used for the disc brake assembled in such as the passenger car and is based on the following technologies.

(1) In the friction material, which is manufactured by forming the NAO friction material composition, including the binder, the fiber base material, the friction modifier, the lubricant, the pH adjuster, and the filler, the friction material composition contains 2-6 weight % of the alkali metal salt and/or the alkaline earth metal hydroxide as the pH adjuster relative to the total amount of the friction material composition, 1-7 weight % of fibrillated organic fiber as the fiber base material relative to the total amount of the friction material composition, 0.5-5 weight % of a normal activated carbon, which is a porous inorganic particle having a sulfite ion absorbing function, as the friction modifier relative to the total amount of the friction material composition, and 0-0.5 weight % of the water-repelling component relative to the total amount of the friction material composition.

(2) In the friction material based on the above (1), the pH adjuster is one kind or a combination of two or more kinds selected from the sodium carbonate, the potassium carbonate, the sodium bicarbonate, the potassium bicarbonate, and the calcium hydroxide.

(3) In the friction material based on either (1) or (2), the fibrillated organic fiber is one kind or a combination of two or more kinds selected from the aramid fiber, the cellulosic fiber, and the acrylic fiber.

(4) In the friction material based on any of (1)-(3), the friction material composition contains 0.5-6 weight % of the zinc sulfide as the lubricant relative to the total amount of the friction material composition.

(5) In the friction material based on any of (1)-(4), the friction material composition contains magnesium potassium titanate as the inorganic friction modifier.

Advantage of the Invention

In relation to the friction material, which is manufactured by forming the NAO friction material composition, used for the disc brake assembled in such as the passenger car, this invention can offer the on material that does not degrade the inhibitory effect of rusting and prevents the seizure due to corrosion even if the automotive while the parking brake in operation is left under a high humidity state for a long period of time.

EMBODIMENTS

In relation to the friction material, which is manufactured by forming the NAO friction material composition, including the binder, the fiber base material, the friction modifier, the lubricant, the pH adjuster, and the filler, this invention uses the friction material composition containing 2-6 weight % of the alkali metal hydroxide as the pH adjuster relative to the total amount of the friction material composition, 1-7 weight % of the fibrillated organic fiber as the fiber base material relative to the total amount of the friction material composition, 0.5-5 weight % of a normal activated carbon, which is a porous inorganic particle having a sulfite ion absorbing function, as the friction modifier relative to the total amount of the friction member composition, and 0-0.5 weight % of the water-repelling component relative to the total amount of the friction material composition.

Arranging the friction material composition according to the above-constitution, the friction material does not degrade the inhibitory effect of rusting and prevents the seizure due to corrosion even if the automotive while the parking brake in operation is left under a high humidity state for a long period of time.

The friction material composition can contain 2-6 weight % of the alkali metal salt and/or the alkaline earth metal hydroxide as the pH adjuster relative to the total amount of the friction material composition in order to maintain the alkaline of pH of the contacting surfaces between the friction material and disc rotor, thereby inhibiting the disc rotor rusting.

When the automotive while the parking brake is in operation is left under a high humidity state for a long period of time, the pH adjuster existing at the friction material surface elutes with moisture in the air and gradually decreases.

This invention can supply appropriate water-absorbency to the friction material by containing 1-7 weight % of the fibrillated organic fiber as the fiber base material relative to the total amount of the friction material composition and also limiting the amount of the water-repelling component to 0-0.5 weight % relative to the total amount of the friction material composition.

As configuring the friction material composition as above, water tends to flow into the friction material interior, and the pH adjuster existing inside the friction material oozed to the surface of the friction material; therefor it becomes possible to maintain the antirust effect by the pH adjuster.

The pH adjuster may be one kind or a combination of two or more kinds selected from the alkali metal salt such as a sodium carbonate, a potassium carbonate, a sodium bicarbonate, and a potassium bicarbonate, and the alkaline earth metal hydroxide such as a calcium hydroxide.

The fibrillated organic fiber may be one kind or a combination of two or more kinds selected from an aramid fiber, a cellulosic fiber, and an acrylic fiber.

If the amount of the alkali metal salt and the alkaline earth metal hydroxide functioning as the pH adjuster is less than 2 weight % relative to the total amount of friction material composition, desirable antirust effect cannot be achieved, and if the amount of the alkali metal salt and the alkaline earth metal salt exceeds 6 weight % relative to the total amount of friction material composition, the excessive amount can be a cause of interfering the curing reaction of a phenolic resin as the binder in the heat press forming step, thereby causing a problem to reduce the wear resistance of the friction material.

Also, if the amount of the fibrillated organic fiber is less than 1 weight % relative to the total amount of the friction material composition, it is impossible to provide an appropriate water-absorbency to the friction material, thereby failing to maintain the antirust effect, and if the amount of the fibrillated organic fiber exceeds 7 weight %, a fiber ball is formed in the mixing step, thereby causing a problem tending to cause a mixing failure state.

Furthermore, this invention contains 0.5-6 weight % of the zinc sulfide as the lubricant relative to the total amount of the friction material composition.

A zinc sulfide supplies lubricating effect to the friction material and improves the wear resistance thereof, and at the same time the zinc sulfide is dissolved due to the frictional heat between the friction material and the disc rotor during the brake operation and is characterized to generate a zinc metal.

When a film including the zinc metal is formed on a frictional surface of the disc rotor, the zinc metal becomes sacrificial anode to inhibit the disc rotor rusting.

However, if the zinc sulfide absorbs water, it oxides gradually to be modified into zinc sulfate, thereby generating a sulfate ion which is a cause of rusting.

Accordingly, this invention is designed to contain 0.5-5 weight % of a porous inorganic particle having a sulfate ion absorbing function as the friction modifier relative to the total amount of the friction material composition in order to inhibit the rusting due to the sulfate ion generated from the zinc sulfide.

The porous inorganic particle may be such as a zeolite, an activated carbon, and an activated alumina.

It is preferable to use the activated carbon alone.

Furthermore, this invention contains a magnesium potassium titanate as the inorganic friction modifier. The magnesium potassium titanate has a higher alkali elution rate than a potassium hexatitanate, a potassium octatitanate, and a lithium potassium titanate, and therefore pH on the contacting surface between the friction material and the disc rotor may be maintained in the alkaline condition, thereby improving the rust inhibitory effect.

The friction material of this invention is made of the friction material composition conventionally used for the friction material, which contains the binder, the fiber base material, the friction modifier, the lubricant, and the filler in addition to the above-described pH adjuster, the fibrillated organic fiber, the zinc sulfide, and the porous inorganic particle having the absorption function of the sulfite ion.

The binder may be one kind or two or more kinds selected from the materials conventionally used for the friction material such as a straight phenolic resin, a modified resin obtained by modifying the phenolic resin with cashew oil or various elastomers such as acrylic rubber or silicon rubber, an aralkyl modified phenolic resin obtained by reacting a phenols with aralkyl ethers and aldehydes, and a thermosetting resin dispersing various elastomers or fluoropolymers in the phenolic resin.

The amount of the binder is preferably 9-15 weight %, more preferably 8-12 weight %, relative to the total amount of the friction material composition in order to secure sufficient mechanical strength and wear resistance.

The fiber base material, in addition to the fibrillated organic fiber, may be one kind or two or more kinds selected from non-iron metallic fibers such as an aluminum-zinc alloy fiber.

The amount of the fiber base material together with the above-described fibrillated organic fiber is preferably 5-20 weight %, more preferably 7-15 weight %, relative to the total amount of the friction material composition.

The lubricant, in addition to the above-described zinc sulfide, may be one kind or two or more kinds selected from lubricants conventionally used for the friction material such as a metal sulfide type lubricant such as a molybdenum disulfide, a tin sulfide, an iron sulfide, and a composite metal sulfide and a carbon type lubricant such as an artificial graphite, a natural graphite, a flakey graphite, a petroleum coke, an elastic graphitic carbon, and a ground powder of oxidized polyacrylonitrile fiber.

The amount of lubricant together with the above-described zinc sulfide is preferably 3-8 weight %, more preferably 4-6 weight %, relative to the total amount of the friction material composition.

The inorganic friction modifier, in addition to the above-described porous inorganic particle and the magnesium potassium titanate, may be one kind or two or more kinds selected from a particle inorganic friction modifier such as a zirconium dioxide, a zirconium silicate, a magnesium oxide, an α-alumina, a talc, a mica, a vermiculite, various metal particles such as a copper and a brass, a plate shaped titanate or a titanate in an indefinite shape having multiple convex portions other than the magnesium potassium titanate, and a fiber inorganic friction modifier such as a wollastonite, a sepiolite, a basalt fiber, a grass fiber, a biosoluble ceramic fiber, and a rock wool.

The amount of the inorganic friction modifier together with the above-described porous inorganic particle is preferably 40-50 weight %, more preferably 43-47 weight %, relative to the total amount of the friction material composition.

The organic friction modifier may be one kind or two or more kinds selected from the conventionally used organic friction modifier such as a cashew dust, a pulverized powder of tire tread rubber, and a vulcanized or an unvulcanized rubber powder such as a nitrile rubber, an acrylic rubber, a butyl rubber, and a silicone rubber.

The amount of the organic friction modifier is preferably 3-8 weight %, more preferably 4-7 weight %, of the total amount of the friction material composition.

The residual substances of the friction material composition may be a filler such as a barium sulfate.

Among the above-described materials, the materials that have the water-repelling effect are the silicone rubber modified phenolic resin, the silicone rubber dispersed phenolic resin, a fluoropolymer dispersed phenolic resin, a silicone rubber powder, and various friction modifier coated with such as the silicone rubber or the silicone oil, and when the material having the water-repelling effect needs to be used, the total amount of the water-repelling component among the silicone rubber, the silicone oil, and fluoropolymer is arranged to be 0-0.5 weight % relative to the total amount of the friction material composition.

Also, regarding the copper content contained in the friction material, California State (CA) and Washington State (WA) of the United States of America passed a bill to prohibit the sales of the friction member using the friction material containing 5 weight % or more of the copper component relative to the total amount of the friction material composition and an act of assembling the subject friction material in a new car from the year of 2021, and the sales of the friction member using the friction material containing 0.5 weight % or more of the copper component relative to the total amount of the friction material composition and an act of assembling the subject friction material in a new car several years later from the year of 2023. Therefore, the copper component contained in the fiber and particle is preferably adjusted to comply with the laws and regulations when employed in the friction material composition, and preferably the copper component fibers and particles containing a copper component is not added to the friction material composition.

The friction material of this invention is manufactured through a mixing step for uniformly mixing the predetermined amount of the friction material composition by a mixer, a heat press forming step for superposing and placing the obtained raw friction material mixture and a pre-washed, pre-surface treated, and pre-adhesive coated back plate in a heat press die to be heat pressed, thereby forming in the die, a heat treatment step for heating the obtained molded product to complete the curing reaction of the binder, an coating step of applying the coating thereon by spray coating or electrostatic powder coating, a coating baking step for baking the coating thereon, and a grinding step for forming the friction surface by a rotary grindstone. Also, after the heat press forming step, it is possible to process through the coating step, the heat treatment step in combination with the coating baking step, and the grinding step in this order.

As necessary, before the heat press forming step, it is possible to process through a granulation step for granulating the raw friction material mixture, a kneading step for kneading the raw friction material mixture, and a preforming step for placing the friction material mixture, obtained granulated substance after the granulation step, and/or obtained kneaded substance after the kneading step and forming the preformed substance, and after the heat press forming step, a scorching step is performed.

In the following sections, embodiments and comparative examples of this invention will be explained concretely; however, this invention is not limited to the following embodiments.

Manufacturing Method for Friction Material in Embodiments 1-26 and Comparative Examples 1-5

The friction material composition shown in TABLE 1, TABLE 2, and TABLE 3 is mixed for 5 minutes by the Loedige mixer and is pressed in the forming die for 10 seconds under 30 MPa. This preformed substance is superposed on the steel back plate that is pre-washed, pre-surface treated, and pre-adhesive coated, formed in the heat forming die at 150 degrees centigrade of the forming temperature under 40 MPa of the forming pressure for 10 minutes. After that, heat-treated (cured) at 200 degrees centigrade for 5 hours, and grinded to form the friction surface in order to manufacture the disc brake pad for a passenger car. (See Embodiments 1-26 and Comparative Examples 1-5)

TABLE 1

| | Raw Material | Water-Repelling Material | Embodiments | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Binder | Phenolic Resin | | 10 | 10 | 10 | 10 | 10 | 10 | 10 | 10 | 10 | 7.5 | 10 | 10 | 10 |
| | Silicone Rubber Modified Phenolic Resin (8 weight % of Silicone Rubber) | ○ | | | | | | | | | | 2.5 | | | |
| pH Adjuster | Calcium Hydroxide | | 4 | | | | | 4 | 4 | 4 | 4 | 4 | 2 | 6 | 4 |
| | Potassium Carbonate | | | 4 | | | | | | | | | | | |
| | Potassium Bicarbonate | | | | 4 | | | | | | | | | | |
| | Sodium Carbonate | | | | | 4 | | | | | | | | | |
| | Sodium Bicarbonate | | | | | | 4 | | | | | | | | |
| Fiber Base Material | Fibrillated Aramid Fiber | | 5 | 5 | 5 | 5 | 5 | | | 5 | 5 | 5 | 5 | 5 | 1 |
| | Fibrillated Cellulosic Fiber | | | | | | | 5 | | | | | | | |
| | Fibrillated Acrylic fiber | | | | | | | | 5 | | | | | | |
| Lubricant | Zinc Sulfide | | 3 | 3 | 3 | 3 | 3 | 3 | 3 | | 3 | 3 | 3 | 3 | 3 |
| | Molybdenum Disulfide | | | | | | | | | 3 | | | | | |
| | Graphite | | 2 | 2 | 2 | 2 | 2 | 2 | 2 | 2 | 2 | 2 | 2 | 2 | 2 |
| Inorganic Friction Modifier | Hydrophilic Activated Carbon | | 3 | 3 | 3 | 3 | 3 | 3 | 3 | 3 | | 3 | 3 | 3 | 3 |
| | Zeolite | | | | | | | | | | 3 | | | | |
| | Plate Shaped Potassium Hexatitanate | | 30 | 30 | 30 | 30 | 30 | 30 | 30 | 30 | 30 | 30 | 30 | 30 | 30 |
| | Plate Shaped Magnesium Potassium Titanate | | | | | | | | | | | | | | |
| | Zirconium Silicate | | 2 | 2 | 2 | 2 | 2 | 2 | 2 | 2 | 2 | 2 | 2 | 2 | 2 |
| | Mica | | 3 | 3 | 3 | 3 | 3 | 3 | 3 | 3 | 3 | 3 | 3 | 3 | 3 |
| | Zirconium Dioxide | | 8 | 8 | 8 | 8 | 8 | 8 | 8 | 8 | 8 | 8 | 8 | 8 | 8 |
| | wollastonite | | 2 | 2 | 2 | 2 | 2 | 2 | 2 | 2 | 2 | 2 | 2 | 2 | 2 |
| Organic Friction Modifier | Cashew Dust | | 3 | 3 | 3 | 3 | 3 | 3 | 3 | 3 | 3 | | 3 | 3 | 3 |
| | Silicone Rubber Coated Cashew Dust (10 weight % of Silicone Rubber) | ○ | | | | | | | | | | 3 | | | |
| | Pulverized Powder of Tire Tread Rubber | | 2 | 2 | 2 | 2 | 2 | 2 | 2 | 2 | 2 | 2 | 2 | 2 | 2 |
| Filler | Barium Sulfate | | 23 | 23 | 23 | 23 | 23 | 23 | 23 | 23 | 23 | 23 | 25 | 21 | 27 |
| | Total (Weight %) | | 100 | 100 | 100 | 100 | 100 | 100 | 100 | 100 | 100 | 100 | 100 | 100 | 100 |
| | Water-Repelling Component (Weight %) | | 0 | 0 | 0 | 0 | 0 | 0 | 0 | 0 | 0 | 0.5 | 0 | 0 | 0 |

TABLE 2

| Raw Material | | Water-Repelling Material | Embodiments | | | | | | | | | | | | |
|---|---|---|---|---|---|---|---|---|---|---|---|---|---|---|---|
| | | | 14 | 15 | 16 | 17 | 18 | 19 | 20 | 21 | 22 | 23 | 24 | 25 | 26 |
| Binder | Phenolic Resin | | 10 | 10 | 10 | 10 | 10 | 10 | 10 | 10 | 10 | 10 | 10 | 10 | 10 |
| | Silicone Rubber Modified Phenolic Resin (8 weight % of Silicone Rubber) | ○ | | | | | | | | | | | | | |
| pH Adjuster | Calcium Hydroxide | | 4 | 4 | 4 | 4 | 4 | 4 | 4 | 4 | 4 | 4 | 2 | 4 | 4 |
| | Potassium Carbonate | | | | | | | | | | | | | | |
| | Potassium Bicarbonate | | | | | | | | | | | | | | |
| | Sodium Carbonate | | | | | | | | | | | | | | |
| | Sodium Bicarbonate | | | | | | | | | | | | | | |
| Fiber Base Material | Fibrillated Aramid Fiber | | 7 | 5 | 5 | 5 | 5 | 5 | 5 | 5 | 5 | 5 | 5 | 5 | 5 |
| | Fibrillated Cellulosic Fiber | | | | | | | | | | | | | | |
| | Fibrillated Acrylic fiber | | | | | | | | | | | | | | |
| Lubricant | Zinc Sulfide | | 3 | 0.3 | 0.5 | 6 | 7 | 3 | 3 | 3 | 3 | 3 | 3 | 0.3 | 3 |
| | Molybdenum Disulfide | | | 2.7 | 2.5 | | | | | | | | | 2.7 | |
| | Graphite | | 2 | 2 | 2 | 2 | 1 | 2 | 2 | 2 | 2 | 2 | 2 | 2 | 2 |
| Inorganic Friction Modifier | Hydrophilic Activated Carbon | | 3 | 3 | 3 | 3 | 3 | 0.3 | 0.5 | 5 | 6 | | 3 | 3 | 0.3 |
| | Zeolite | | | | | | | | | | | 3 | | | |
| | Plate Shaped Potassium Hexatitanate | | 30 | 30 | 30 | 30 | 30 | 30 | 30 | 30 | 30 | | | | |
| | Plate Shaped Magnesium Potassium Titanate | | | | | | | | | | | | 30 | 30 | 30 | 30 |
| | Zirconium Silicate | | 2 | 2 | 2 | 2 | 2 | 2 | 2 | 2 | 2 | 2 | 2 | 2 | 2 |
| | Mica | | 3 | 3 | 3 | 3 | 3 | 3 | 3 | 3 | 3 | 3 | 3 | 3 | 3 |
| | Zirconium Dioxide | | 8 | 8 | 8 | 8 | 8 | 8 | 8 | 8 | 8 | 8 | 8 | 8 | 8 |
| | wollastonite | | 2 | 2 | 2 | 2 | 2 | 2 | 2 | 2 | 2 | 2 | 2 | 2 | 2 |
| Organic Friction Modifier | Cashew Dust | | 3 | 3 | 3 | 3 | 3 | 3 | 3 | 3 | 3 | 3 | 3 | 3 | 3 |
| | Silicone Rubber Coated Cashew Dust (10 weight % of Silicone Rubber) | ○ | | | | | | | | | | | | | |
| | Pulverized Powder of Tire Tread Rubber | | 2 | 2 | 2 | 2 | 2 | 2 | 2 | 2 | 2 | 2 | 2 | 2 | 2 |
| Filler | Barium Sulfate | | 21 | 23 | 23 | 20 | 20 | 25.7 | 25.5 | 21 | 20 | 23 | 25 | 23 | 25.7 |
| | Total (Weight %) | | 100 | 100 | 100 | 100 | 100 | 100 | 100 | 100 | 100 | 100 | 100 | 100 | 100 |
| | Water-Repelling Component (Weight %) | | 0 | 0 | 0 | 0 | 0 | 0 | 0 | 0 | 0 | 0 | 0 | 0 | 0 |

TABLE 3

| Raw Material | | Water-Repelling Material | Comparative Examples | | | | |
|---|---|---|---|---|---|---|---|
| | | | 1 | 2 | 3 | 4 | 5 |
| Binder | Phenol Resin | | 3 | 10 | 10 | 10 | 10 |
| | Silicone Rubber Modified Phenol Resin (8 weight % of Silicone Rubber) | ○ | 7 | | | | |
| pH Adjuster | Calcium Hydroxide | | 4 | 1 | 7 | 4 | 4 |
| | Potassium Carbonate | | | | | | |
| | Potassium Bicarbonate | | | | | | |
| | Sodium Carbonate | | | | | | |
| | Sodium Bicarbonate | | | | | | |
| Fiber Base | Fibrillated Aramid Fiber | | 5 | 5 | 5 | 0.5 | 8 |
| | Fibrillated Cellulose Fiber | | | | | | |
| | Fibrillated Acrylic fiber | | | | | | |
| Lubricant | Zinc Solfide | | 3 | 3 | 3 | 3 | 3 |
| | Molybdenum Disulfide | | | | | | |
| | Graphite | | 2 | 2 | 2 | 2 | 2 |
| Inorganic Friction Modifier | Hydrophilic Activated Carbon | | 3 | 3 | 3 | 3 | 3 |
| | Zeolite | | | | | | |
| | Plate Shaped Potassium Hexatitanate | | 30 | 30 | 30 | 30 | 30 |
| | Plate Shaped Magnesium Potassium Titanate | | | | | | |

TABLE 3-continued

| | Raw Material | Water-Repelling Material | Comparative Examples 1 | 2 | 3 | 4 | 5 |
|---|---|---|---|---|---|---|---|
| | Zirconium Silicate | | 2 | 2 | 2 | 2 | 2 |
| | Mica | | 3 | 3 | 3 | 3 | 3 |
| | Zirconium Dioxide | | 8 | 8 | 8 | 8 | 8 |
| | wollastonite | | 2 | 2 | 2 | 2 | 2 |
| Organic Friction Modifier | Cashew Dust | | 3 | 3 | 3 | 3 | 3 |
| | Silicone Rubber Coated Cashew Dust (10 weight % of Silicone Rubber) | ○ | | | | | |
| | Pulverized Powder of Tire Tread Rubber | | 2 | 2 | 2 | 2 | 2 |
| Filler | Barium Sulfate | | 23 | 26 | 20 | 27.5 | 20 |
| | Total (Weight %) | | 100 | 100 | 100 | 100 | 100 |
| | Water-Repelling Component (Weight %) | | 0.56 | 0 | 0 | 0 | 0 |

Seizure due to corrosion of these disc brake pads are evaluated under the following conditions. The evaluation results are shown in TABLE 4, TABLE 5, and TABLE 6.

<Evaluation>

<Seizure Due to Corrosion>

An actual passenger car with a rear brake having a parking brake inside is evaluated at every following operation. The disc rotor used here is made from a cast iron (FC250).

(1) Burnishing (2) Splashing Water (3) Braking (Predetermined Cycles)

(4) Leaving Outdoors While Parking Brake is in Operation

As repeating (2)-(4) everyday, torque at the initial starting stage on the seventh and fourteenth days was measured. The evaluation standard is stated below.

◎: less than 50 Nm

○: 50 Nm or more but less than 80 Nm

△: 80 Nm or more but less than 150 Nm x: 150 Nm or more

-: No evaluation due to mixing failure

<Wear Resistance>

Complying with JASO C427, "Automobile parts—Brake lining and disc brake pad—Wear test procedure on inertia dynamometer", the wear amount (mm) of the friction material was measured under the condition that the braking initial speed was 50 km/h, the braking deceleration speed was 0.3G, and the braking cycle was determined at appropriate intervals, and was evaluated under the following evaluation standard after converting into the wear amount equivalent to the amount after 1000 braking cycles.

◎: less than 0.5

○: 0.15 or more but less than 0.20

△: 0.20 or more but less than 0.50 x: 0.50 or more

-: No evaluation due to mixing failure

<Condition of Mixture>

Condition of mixture of the raw friction material mixture was visually evaluated.

○: No fiber ball generated x: Fiber ball generated

TABLE 4

| | | Embodiments | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Evaluation Result | Seizure due to corrosion (7th Day) | ◎ | ◎ | ◎ | ◎ | ◎ | ◎ | ◎ | ◎ | ◎ | ◎ | ○ | ◎ | ◎ |
| | Seizure due to corrosion (14th Day) | ◎ | ◎ | ◎ | ◎ | ◎ | ◎ | ◎ | △ | ○ | △ | △ | ◎ | △ |
| | Wear Resistance | ◎ | ◎ | ◎ | ◎ | ◎ | ◎ | ◎ | ◎ | ◎ | ◎ | ◎ | △ | ○ |
| | Condition of Mixture | ○ | ○ | ○ | ○ | ○ | ○ | ○ | ○ | ○ | ○ | ○ | ○ | ○ |

TABLE 5

| | | Embodiments | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Evaluation Result | Seizure due to corrosion (7th Day) | ◎ | ◎ | ◎ | ◎ | ◎ | ◎ | ◎ | ◎ | ◎ | ◎ | ◎ | ◎ | ◎ |
| | Seizure due to corrosion (14th Day) | ◎ | △ | ○ | ○ | △ | △ | ○ | ◎ | ◎ | ◎ | ○ | ○ | ○ |
| | Wear Resistance | ◎ | ◎ | ◎ | ◎ | ◎ | ◎ | ◎ | ◎ | ◎ | ◎ | ◎ | ◎ | ◎ |
| | Condition of Mixture | ○ | ○ | ○ | ○ | ○ | ○ | ○ | ○ | ○ | ○ | ○ | ○ | ○ |

TABLE 6

| | | Comparative Examples | | | | |
|---|---|---|---|---|---|---|
| | | 1 | 2 | 3 | 4 | 5 |
| Evaluation Result | Seizure due to corrosion (7th Day) | ◎ | Δ | ◎ | ◎ | — |
| | Seizure due to corrosion (14th Day) | X | X | ◎ | X | — |
| | Wear Resistance | ◎ | ◎ | X | ○ | — |
| | Condition of Mixture | ○ | ○ | ○ | ○ | X |

As shown in each TABLE, any combination satisfying the composition requirement of this invention shows a positive or good result. Such combination did not degrade the inhibitory effect of rusting and prevents rust adhesion even if the automotive while the parking brake in operation was left under high humidity state for a long period of time. Also, the wear resistance did not degrade, and the condition of mixture was fine.

INDUSTRIAL APPLICABILITY

According to this invention, the friction material used for the disc brake pad, which is manufactured by forming the NAO friction material composition, shows significant high practical value and do not degrade the inhibitory effect of rusting and prevents seizure due to corrosion even if the automotive while the parking brake in operation is left under high humidity state for a long period of time while satisfying laws and regulations relating to the required amount of the content of the copper component.

The invention claimed is:

1. A friction material, which is manufactured by forming a non-asbestos-organic (NAO) friction material composition, comprising a binder, a fiber base material, at least one friction modifier, a lubricant, a pH adjuster, and a filler, wherein
said friction material composition contains:
2-6 weight % of one kind or a combination of two or more kinds selected from a sodium carbonate, a potassium carbonate, a sodium bicarbonate, a potassium bicarbonate, and a calcium hydroxide as the pH adjuster relative to the total amount of the friction material composition,
1-7 weight % of an organic fiber that is fibrillated as the fiber base material relative to the total amount of the friction material composition,
3-8 weight % of at least one of metal sulfide lubricants and at least one of carbon type lubricants,
0.5-5 weight % of a porous inorganic particle having a sulfate ion absorbing function as at least one of the friction modifiers relative to the total amount of the friction material composition, where said porous inorganic particle is an activated carbon, and
0-0.5 weight % of a water-repelling component relative to the total amount of the friction material composition,
said metal sulfide lubricant includes 0.5-6 weight % of a zinc sulfide relative to the total amount of the friction material composition, and
said carbon type lubricant comprises at least one of an artificial graphite, a natural graphite, and a flaky graphite.

2. The friction material according to claim 1, wherein
said organic fiber is one kind or a combination of two or more kinds selected from an aramid fiber, a cellulosic fiber, and an acrylic fiber.

3. The friction material according to claim 1, wherein said friction material composition contains a magnesium potassium titanate as at least one of the modifiers.

* * * * *